(12) United States Patent
Landowski et al.

(10) Patent No.: US 10,333,868 B2
(45) Date of Patent: Jun. 25, 2019

(54) TECHNIQUES TO AUTOMATE BOT CREATION FOR WEB PAGES

(71) Applicant: Facebook, Inc., Menlo Park, CA (US)

(72) Inventors: Laurent Nicolas Landowski, Emerald Hills, CA (US); Kemal El Moujahid, Mountain View, CA (US); Stepan Parunashvili, San Francisco, CA (US); Andreea-Loredana Crisan, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 36 days.

(21) Appl. No.: 15/489,354

(22) Filed: Apr. 17, 2017

(65) Prior Publication Data

US 2018/0302347 A1    Oct. 18, 2018

Related U.S. Application Data

(60) Provisional application No. 62/485,450, filed on Apr. 14, 2017.

(51) Int. Cl.
*H04L 12/58* (2006.01)
*G06F 16/958* (2019.01)
(Continued)

(52) U.S. Cl.
CPC ............ *H04L 51/02* (2013.01); *G06F 16/958* (2019.01); *G06F 17/279* (2013.01); *H04L 51/14* (2013.01); *H04L 67/02* (2013.01)

(58) Field of Classification Search
CPC ......... H04L 51/02; H04L 51/14; H04L 51/32; H04L 51/046; H04L 51/16; H04L 51/18; H04L 51/22; H04L 67/02; G96F 17/3089; G96F 17/279; G96F 19/30654; G96F 17/28; G96F 17/3043; G96F 17/3064; G96F 17/30663; G96F 17/30684; G06N 3/006;
(Continued)

(56) References Cited

U.S. PATENT DOCUMENTS 6,363,301 B1 * 3/2002 Tackett ................. G06F 17/279
700/246
6,754,647 B1 * 6/2004 Tackett ................. G06F 17/279
700/246
(Continued)

OTHER PUBLICATIONS

International Search Report received for PCT Patent Application No. PCT/US2017/028101, dated Jan. 15, 2018, 3 pages.

*Primary Examiner* — Alina A Boutah

(57) ABSTRACT

A method may comprise receiving a bot creation control directive from a web page; instantiating a page bot from a template; authorizing the page bot to access the contents of the web page; associating the page bot with the web page; and enabling the page bot to respond to messages sent to the web page. The method may further comprise receiving a message at the page bot from a client device; requesting a meaning of the message from a natural language processing component; identifying a field in the web page associated with the page bot according to the meaning of the message; retrieving data from the identified field; composing a message response including the retrieved data; and sending the message response to the client device. Other embodiments are described and claimed.

18 Claims, 13 Drawing Sheets

(51) Int. Cl.
*H04L 29/08* (2006.01)
*G06F 17/27* (2006.01)

(58) Field of Classification Search
CPC . G06N 99/005; G06F 17/3089; G06F 17/279;
G06F 17/30654; G06F 17/28; G06F
17/3043; G06F 17/30663; G06F
17/30684; G06F 17/3064
See application file for complete search history.

(56) References Cited

U.S. PATENT DOCUMENTS

| | | | |
|---|---|---|---|
| 9,959,868 B1* | 5/2018 | Patel | G06F 17/289 |
| 2003/0182391 A1* | 9/2003 | Leber | G06F 17/30864 |
| | | | 709/217 |
| 2005/0102065 A1* | 5/2005 | McBride | G06N 5/025 |
| | | | 700/264 |
| 2005/0125370 A1 | 6/2005 | Brennan et al. | |
| 2007/0043878 A1* | 2/2007 | Carlson | G06F 17/30905 |
| | | | 709/246 |
| 2007/0168480 A1* | 7/2007 | Biggs | H04L 51/04 |
| | | | 709/223 |
| 2009/0281966 A1* | 11/2009 | Biggs | G06F 17/30864 |
| | | | 706/11 |
| 2011/0078105 A1* | 3/2011 | Wallace | G06F 17/30654 |
| | | | 706/47 |
| 2016/0352658 A1* | 12/2016 | Capper | G06N 3/004 |
| 2017/0048170 A1* | 2/2017 | Smullen | H04L 67/322 |
| 2017/0357638 A1* | 12/2017 | Schlesinger | G06F 17/28 |
| 2018/0039618 A1* | 2/2018 | Kumar | G06F 3/0482 |
| 2018/0083894 A1* | 3/2018 | Fung | H04L 51/02 |
| 2018/0083898 A1* | 3/2018 | Pham | G06F 3/04842 |
| 2018/0083901 A1* | 3/2018 | McGregor, Jr. | H04L 51/10 |
| 2018/0102989 A1* | 4/2018 | Borsutsky | H04L 51/02 |
| 2018/0107461 A1* | 4/2018 | Balasubramanian | G06F 8/35 |
| 2018/0109526 A1* | 4/2018 | Fung | H04L 63/168 |
| 2018/0210874 A1* | 7/2018 | Fuxman | G06F 17/2785 |

* cited by examiner

TECHNIQUES TO AUTOMATE BOT CREATION FOR WEB PAGES

RELATED APPLICATIONS

This application claims the benefit of priority under 35 U.S.C. § 119(e) to U.S. Provisional Patent Application No. 62/485,450 titled "Techniques to Automate Bot Creation for Web Pages," filed on Apr. 14, 2017, which is hereby incorporated by reference in its entirety.

BACKGROUND

Businesses, public figures, and other services may provide information and contact opportunities via a web page. Some forms of contact may be interactive and performed in real time. Web pages with high volumes of contact relative to a number of staff that is available to respond, or that receive the same queries repeatedly may benefit from some automation in responding to user messages.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to automate the creation of bots for web pages. Some embodiments are particularly directed to techniques to automate the creation of bots that can communicate information on the web page via messages to users, without requiring programming experience by the web page administrator. In one embodiment, for example, a method may comprise receiving a bot creation control directive from a web page; instantiating a page bot from a template; authorizing the page bot to access the contents of the web page; associating the page bot with the web page; and enabling the page bot to respond to messages sent to the web page. The method may further comprise receiving a message at the page bot from a client device; requesting a meaning of the message from a natural language processing component; identifying a field in the web page associated with the page bot according to the meaning of the message; retrieving data from the identified field; composing a message response including the retrieved data; and sending the message response to the client device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
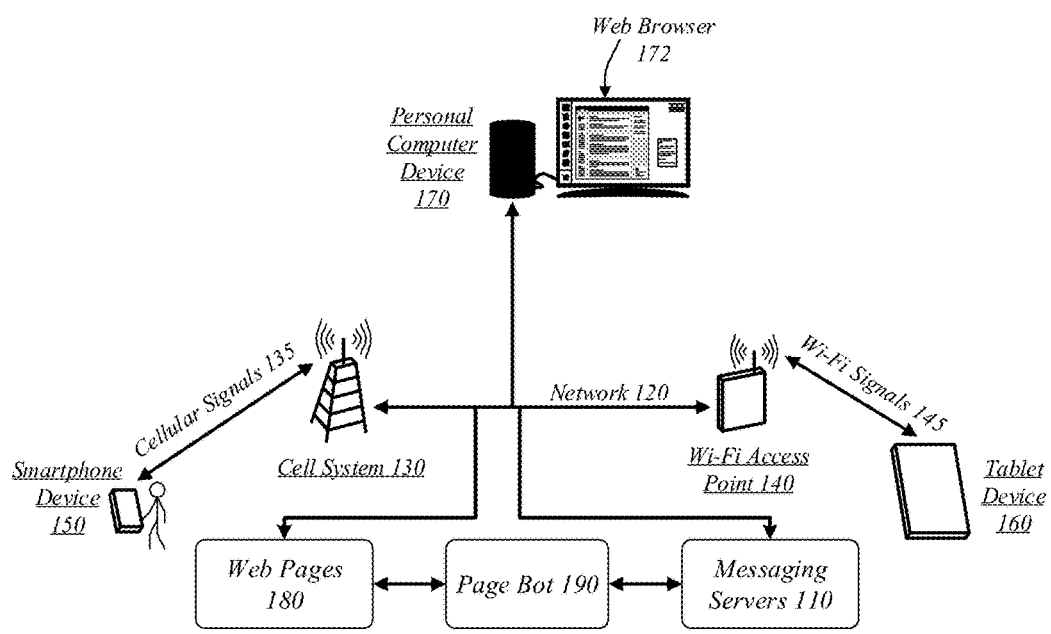
FIG. 1 illustrates an embodiment of a user request communication system.

Businesses and services with web pages accessible to their customers and clients may offer several ways of contacting the business or service (collectively referred to herein as a "service"). In addition to providing telephone numbers and electronic mail addresses, many services also provide a way to communicate with a human agent through an instant message-like interface. However, staffing one or more human agents for live communication can be prohibitively expensive for smaller services.

Some of the human agent interactions can be performed by software applications known as bots. To aid a user in interacting with a service via a messaging context, services may be represented as messaging bots within the messaging system. A messaging bot may be an automated front-end to a network-accessible service that can be represented as a participant within a message thread. In some cases, a messaging bot may be corresponded with in a message thread that explicitly includes the messaging bot, such as a one-on-one message thread between a particular user and the messaging bot. In other cases, a messaging bot may be corresponded with in a message thread in which the messaging bot is not a regular participant, the messaging bot a temporary participant in the message thread for the purposes of interacting with the service. The messaging bot may be included as a temporary participant in any other thread, whether a one-on-one thread between two users or a group thread between multiple users. A bot may have access to natural language processing components, machine learning components, databases, rules, and other resources that can allow the bot to understand a human user request, select an appropriate response or action, and interact with the human user as though the bot were human.

Creating a bot for a service conventionally needs a developer to write the program code or instructions of the bot. Additionally, a human developer may be needed to generate training data or a rule set for the bot to use. The bot may need to be hosted on a platform. Again, for some services, these elements may be prohibitively expensive.

Many services have a presence within a social network system and/or have a presence within a messaging system. For example, the service may have an account in the social network system and/or messaging system that allows other users of the systems to view information about the service and/or interact with messages. For some services, there may be limited time or attention available from the service owner or administrator to respond to messages, and many messages may address the same kinds of questions or issues.

When the service has a web page, many questions received through a messaging interaction may be answered from information on the web page. As such, a system that hosts the web page may provide a way for the service owner or administrator to automatically generate a bot for the web page, and may enable the bot to receive messages, access information on the web page, and respond to messages with the information. In particular, generating the bot may require no programming or development experience from the web page owner or administrator.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a user request communication system 100. In one embodiment, the user request communication system 100 may comprise a computer-implemented system having software applications comprising one or more components. Although the user request communication system 100 shown in FIG. 1 has a limited number of elements in a certain topology, it may be appreciated that the user request communication system 100 may include more or less elements in alternate topologies as desired for a given implementation.

A bot application, possibly of a plurality of bot applications, may operate within a network environment including a messaging system empowering the exchange of messages and other information. The page bot 190 may comprise a software application executing on a computer system. The page bot 190 may use a messaging system to exchange messages comprising user messages and bot messages. User messages may comprise user requests and messages clarifying and specifying user requests. Bot messages may clarify requests for information relating to user requests and performance information relating to user requests. In some cases, the messaging system may comprise a general messaging system also used for other messages. In other cases, the messaging system may comprise a messaging system exclusive to communicating with bot applications such as page bots 190.

The messaging servers 110 may comprise one or more messaging servers operated by a messaging system as part of the user request communication system 100. A messaging server may comprise an Internet-accessible server, with the network 120 connecting the various devices of the user request communication system 100 comprising, at least in part, the Internet.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 160 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 170. The personal computer device 170 may comprise a Mac OS® device, Windows® device, Linux® device, or other computer device running another operating system. The personal computer device 170 may be an Ethernet device capable of connecting to a network 120 via an Ethernet connection. In some embodiments and in some cases the personal computer device 170 may additionally or alternatively use cellular, Wi-Fi, or other networking technologies to the network 120. The personal computer device 170 may execute a messaging client, web browser 172, or other local application to access the messaging servers 110.

The same user may own and operate a personal home assistant device (not shown). A personal home assistant device may comprise, for example, an AMAZON ECHO device, or a GOOGLE HOME device, or any other device configured to receive human voice requests and commands and to access various network services in response thereto. A personal home assistant device may access messaging servers 110 and may interact with page bots 190.

Users may interact with web pages 180 through any of the example devices, in particular, via page bots 190 associated with the web pages 180. A web page 180 may include information about a business, government agency, network accessible service, product, community organization, a public figure, tourist attraction, and so forth. A web page 180 may be hosted, for example, within a social networking service, or may be hosted from other servers or services. While a web page 180 may be viewable, for example, with a web browser 172, or within a client application such as a social network client application, information on the web page 180 may also be accessible through a messaging format. A user may send messages to the web page 180. For example, a web page within a social network may include a call-to-action element on the web page that allows a user to begin and engage in a messaging conversation with the web page entity. When hosted by a third party, the web page may include a plug-in for the messaging service. A page bot 190 may respond to the messages on behalf of the web page 180, or on behalf of a human owner or administrator of the web page 180. The page bot 190 associated with a particular web page 180 may be able to access the information on the web page 180 in order to respond appropriately to a message. The entity represented by the web page 180 may be represented as a social-networking page, with the social-networking page identified with a social-networking page identifier uniquely identifying the entity and its page with the social-networking system. The web page 180 may have a messaging identity, such that the web page 180 is enabled to be sent messages by users of a messaging system. Web pages with a message identity may additionally have a messaging identifier associated with them, uniquely identifying the web page as a message recipient with the messaging system. Web pages may alternatively or additionally have one or more page bots 190 associated with them. Each page bot 190 has a unique bot identifier identifying the page bot. The bot identifier is associated with the page identifier of the web page 180 to associate the page bot with the page. In some embodiments, the bot identifier may also be used to identify the page bot for messaging. In other embodiments, each page bot may have a distinct bot identifier used to identify the bot for messaging. Within the messaging system, a message thread, e.g. a specific grouping of message recipients engaging in a messaging conversation, may be associated with a thread identifier, the thread identifier uniquely identifying the message thread with the messaging system. A bot may be authorized, such as a temporary authorization, to access a message thread through an association, which may also be temporary, between the bot identifier and the message thread identifier A messaging client may be a dedicated messaging client. A dedicated messaging client may be specifically associated with a messaging provider administering the messaging system including the messaging servers 110. A dedicated messaging client may be a general client operative to work with a plurality of different messaging providers including the messaging provider administering the messaging system including the messaging servers 110. A messaging client may empower access to bot applications for the performance of services, such as where the bot applications are one of a plurality of endpoints and/or services accessible via the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for a social networking service, with the computing device providing additional functionality of the social networking service. Similarly, a social networking application may provide both messaging functionality and additional functionality.

The user request communication system 100 may use knowledge generated from interactions in between users. The user request communication system 100 may comprise a component of a social-networking system and may use knowledge generated from the broader interactions of the social-networking system. As such, to protect the privacy of the users of the user request communication system 100 and the larger social-networking system, user request communication system 100 may include an authorization server (or other suitable component(s)) that allows users to opt in to or opt out of having their actions logged by the user request communication system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the user request communication system 100 and other elements of a social-networking system through blocking, data hashing, anonymization, or other suitable techniques as appropriate.

Figure 2:
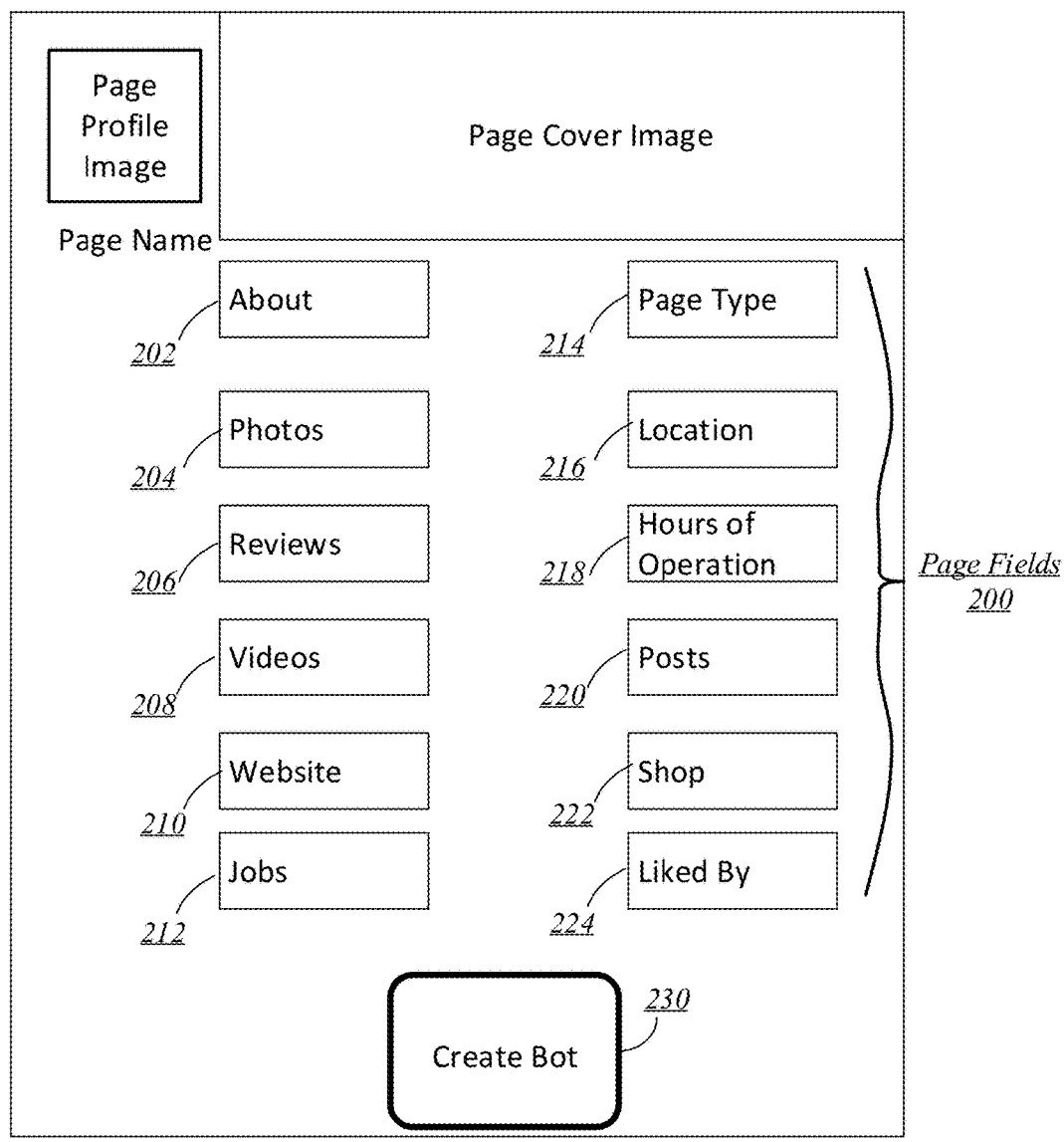
FIG. 2 illustrates an embodiment of a web page that may be associated with a page bot.

FIG. 2 illustrates an embodiment of a web page 280. The web page 280 may be an example of a web page 180. The web page 280 may be created by a human owner or administrator (referred to herein as the administrator) of the entity that the web page 280 will represent. Upon creation, the administrator may select one or more page fields 200 to include on the web page 280. The administrator may also select a page profile image and/or a page cover image to represent the entity visually. The administrator may enter or link information for some of the page fields, and may enable other page fields to receive information from users.

The page fields 200 present on a web page may be selected according to what information is available for the entity and what information is appropriate for the entity. The fields may include an about field 202. The about field 202 may include text that describes the entity in some way, such as what services are provided, who the owner is, how long the entity has existed, or any other information that may distinguish the entity from other similar entities.

The page fields may include a photo field 204. The photo field 204 may include one or more photographs or other images related to the entity. For example, if the entity is a product creating entity, the photos may include photos of the products. If the entity is a celebrity, the photos may include photos of the celebrity. The photo field 204 may contain photos uploaded to the page by the administrator, by other users, or both.

The page fields may include a reviews field 206. When used, the reviews field 206 may include one or more customer reviews of the entity, including ratings and comments.

The page fields may include a videos field 208. Similar to the photo field, the videos field 208 may include videos, for example, product demonstrations, public figure performances, instructional videos and the like. The videos may be uploaded to the page by the administrator, by other user, or both.

The page fields may include a website field 210. If the web page 280 is hosted within a social networking system, for example, the website field 210 may include a link to a publically accessible website for the entity.

The page fields may include a jobs field 212. The jobs field 212 may include information about any employment opportunities related to the entity, and may include a link to a job application or to additional information about the jobs.

The page fields may include a page type field 214. The page type field 214 may include information that categorizes the entity represented by the web page 280. For example, page types may include: business, government agency, artist, celebrity, restaurant, charity, national park, and so forth.

The page fields may include a location field 216. The location field 216 may include a street or mailing address for the entity, or geolocation coordinates. The location field 216 may include a map view or a link to a map view.

The page fields may include an hours of operation field 218. The hours of operation field 218 may include the days of the week and times of the day when the entity is open for business.

The page fields may include a posts field 220. The posts field 220 may include messages, text, images, or other information that the administrator and/or other users have added to the web page 280 that are not included in other fields. The posts field 220 may show some limited number of the most recent posts. Older posts may be viewable, for example, by scrolling down within the posts field 220, or by selecting a control feature to see older posts.

The page fields may include a shop field 222. When the entity engages in sales of any kind, the shop field 222 may include a link to an online storefront. The link to the online storefront may link to a third-party service that provides the sales functionality.

The page fields may include a liked by field 224. When the web page 280 is hosted within a social networking service, the liked by field 224 may show some number of users of the social networking service that have indicated that they "like" the web page 280. In some embodiments, when a user of the social networking service views the web page 280, the liked by field 224 may prioritize showing users that liked the page that also have a connection to the viewing user.

The page fields 200 may include more, fewer, or other fields, and are not limited to the illustrated examples.

Once the administrator has selected one or more of the page fields to use for the web page 280, the administrator may select the create bot control element 230 with a control directive. The create bot control element 230 may be a call-to-action button that is visible to the page administrator. A call-to-action button may comprise a control empowering access to a particular action with an associated visual representation inviting the user to engage in that action. The administrator may choose to create a bot using the create bot control element 230 at any time once the web page 280 is created. Receiving a control directive at the create bot control element 230 may cause a page bot 190 to be generated from a template, as will be described further below.

Figure 3:
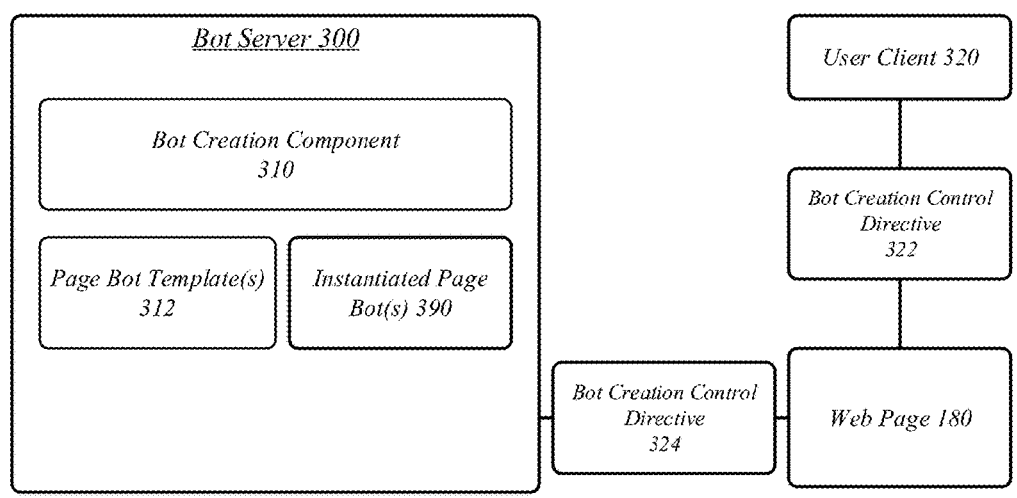
FIG. 3 illustrates an embodiment of a page bot creation being performed by a user request communication system.

FIG. 3 illustrates an embodiment of a page bot creation being performed by a user request communication system 100.

The creation of a page bot may be performed by a bot server 300. The bot server 300 may be communicatively coupled to one or more web pages 180. In some embodiments, the bot server 300 and the one or more servers that host the web pages 180 may be owned or controlled by the same entity, for example, a social networking service. In other embodiments, the bot server 300 and the one or more servers that host the web pages 180 may be owned or controlled by different entities.

The process of creating a page bot may begin when a user, e.g. the web page administrator, issues a bot creation control directive 322 via the user client device 320 to create a page bot. For example, the administrator may select the create bot control element 230 on the web page 180.

Receiving the bot creation control directive 322 may cause the web page 180 to communicate a bot creation control directive 324 to the bot server 300. The bot creation control directive 324 may direct the bot server to create a page bot for the web page 180. The bot creation control directive 324 may be a be a function call, a request to execute a script or any other communication that causes the bot serve 300 to create a page bot. The bot creation control directive 324 may include information that identifies which web page 180 is requesting the creation of a page bot, e.g. a PageID, information that identifies an administrator account of the web page administrator, and so forth.

A bot creation component 310 may instantiate a new page bot from a page bot template 312. A page bot template 312 may include software instructions that allow an instantiated page bot 390 to receive messages directed to a web page, understand the message, retrieve information from the web page relevant to the meaning of the message, and to respond to the message. When instantiated, the instance of the page bot may complete the page bot template 312 by completing various fields and/or assigning values to variables, such as with an association to the web page 180 that requested its creation. For example, the bot server 300 may receive a unique bot identifier and a messaging bot identifier used for messaging, which the bot creation component may use to fill in a page bot template. Additionally, instantiating the page bot may include authorizing the page bot to access the contents of the web page, for example, with an authorization token. Once the page bot template is created, no further developer time may be needed, and any number of web page administrators may associate a page bot with their web pages without needing programming experience themselves.

The instantiation of the page bot may also include enabling the page bot to respond to messages directed to the web page. For example, the page bot identifier and/or the messaging bot identifier may be associated with a messaging identifier and/or Page ID of the web page 180. When a messaging conversation is begun with the web page, the messaging bot identifier may be associated with the thread ID of the conversation thread. Of note is that an administrator of the web page may also view and response to messages directed to the web page. Accordingly, two different responding entities: the page bot and the administrator account, may be able to see and respond to a message sent to the web page. In an embodiment, both the administrator account and the page bot may appear to be the same entity, in other words, the user may not know that two different entities are generating responses. In another embodiment, the administrator and the page bot may appear as two separate entities such that the user may know that one response comes from the page bot while another comes from the administrator. The messaging system may have the two different entities associated with the same web page.

In an embodiment, all page bots created by the bot creation component 310 may be instantiated from the same page bot template 312. In other embodiments, a plurality of page bot templates may exist, and may be selected for use according to various factors. For example, there may be different page bot templates 312 for different page types and/or for different areas of commerce in which a business may operate. For example, an airline may be associated, as a business, with airline commerce and may, therefore, be provided with information and functionality to aid in the performance of operations related to the airline industry. As such, a commerce entity, such as a business, may correspond to a commerce type, such as a clothing realtor being associated with a clothing type, retail sales type, clothing retail type, etc, Different page bot templates may be available for different commerce types.

A commerce type may comprise the local travel commerce type, ride-sharing commerce type, airline commerce type, hotel commerce type, retail commerce type, or any other commerce type. For instance, the airline commerce type may be supported by an airline-specific page bot templates for communicating airline information (e.g., arrival times, department times, departure gate specifications, baggage claim specifications, connecting flight specifications, flight delay updates), airline-specific attachment types for providing air-transport information (e.g., a ticket receipt, a boarding pass, a baggage claim ticket), airline-specific forms for configuring air-transport services (e.g., booking a ticket, rescheduling a ticket, checking-in to a flight, arranging for checked baggage), and other airline-specific templates. Different page bot templates may include different combinations of text, images, titles, subtitles, and call-to-action (CTA) buttons.

There may be different page bot templates available for different payment amounts. For example, use of a basic page bot template may be free or associated with a nominal charge, while the use of page bot templates that provide more features or customized features may be associated with a higher charge.

Once a page bot is instantiated, it may be stored with other instantiated page bots 390 on the bot server 300 or on a separate server or storage device in communication with the bot server 300. Once instantiated, a page bot 390 may be ready and able to receive messages sent to its associated web page 180, determine the meaning of the message, and generate a message response from information accessed from the associated web page 180.

Figure 4:
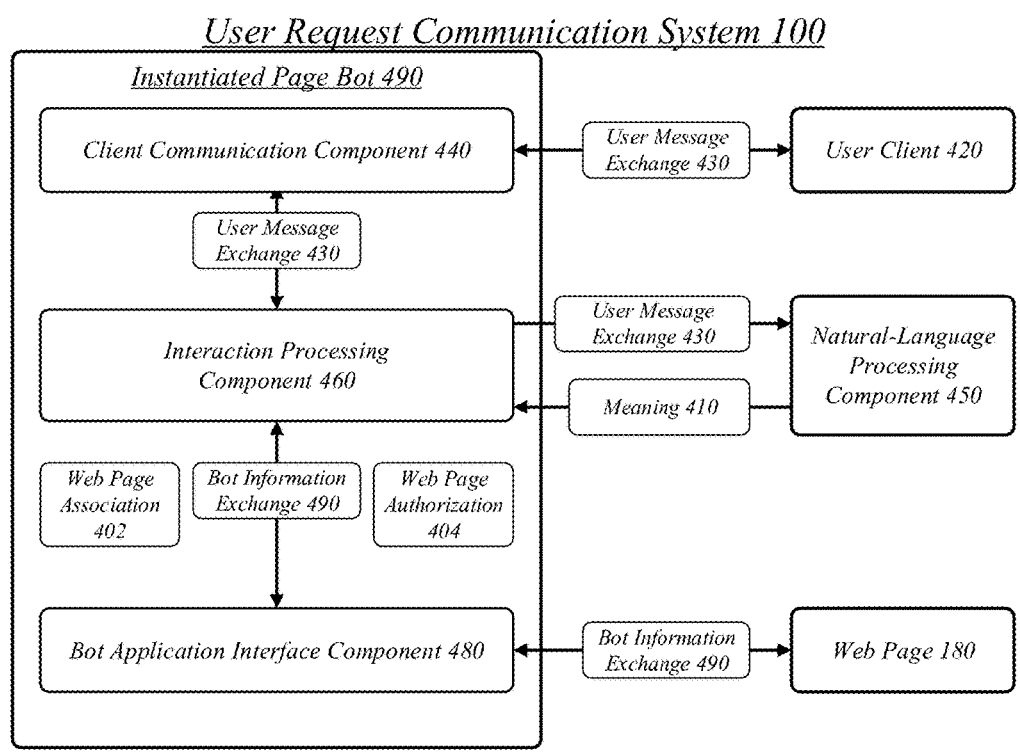
FIG. 4 illustrates an embodiment of a user-to-bot conversation being performed by a user request communication system.

FIG. 4 illustrates an embodiment of a user-to-bot conversation being performed by a user request communication system 100.

The user-to-bot conversation may be conducted by an instantiated page bot 490. The instantiated page bot 490 may be coupled to messaging servers 110 for a messaging system. The messaging servers 110 may perform the sending and receiving of messages between the instantiated page bot 490 and the user client 420. The messaging servers 110 may perform the sending and receiving of information between the instantiated page bot 490 and the web page 180, or a bot application front-end may be used.

A user client 420 may comprise a messaging client, a dedicated client for access to the instantiated page bot 490 or any other client including messaging functionality. The user client 420 may execute on the client device. The user client 420 may engage in a user message exchange 430 with a web page 180 via the instantiated page bot 490 using a client communication component 440. The client communication component 440 may provide a client front-end to the instantiated page bot 490, which may be mediated by the transmission of messages by a messaging system. The user message exchange 430 may comprise the sending of user-composed messages from the user client 420 to the instantiated page bot 490 and the sending of message responses from the instantiated page bot 490 to the user client 420.

A web page association 402 may be stored with the instantiated page bot. The web page association 402 may be used, for example, when communicating with the NLP component 450 to identify the web page that the instance of the page bot is associated with.

An interaction processing component 460 may interface with a natural-language processing (NLP) component 450 to obtain a meaning 410 of a message in the user message exchange 430. An interaction processing component 460 may use the meaning 410 to generate bot responses, including message responses and bot actions. The interaction processing component 460 may act as an intermediary between the client communication component 440 and the bot application interface component 480. A bot action may include performing a software task other than retrieving data from a page field. A bot action may include, for example, interacting with a retail application, or invoking another application.

The NLP component 450 may be implemented using known natural language processing techniques. For example, the interaction processing component 460 of the instantiated page bot 490 may forward or otherwise make the received message accessible to the NLP component 450 with a request for a meaning. The NLP component 450 may use a basic page bot NLP model to parse the message and identify one or more meanings that may be indicated by the message. The basic page bot NLP model may be used for all instantiated page bots 390. If different page bot templates 312 are available, then each template may have its own associated basic page bot NLP model. A basic page bot NLP model may, for example, include rules that associate various user-provided words with a meaning that may map to a page field. Words associated with times or dates, for example, may all map to a meaning of "hours of operation." In some embodiments, the meaning 410 may directly indicate which page field a response should come from.

Other bot NLP models may define the behavior of bots using stories. Stories are example conversations. On top of user messages and bot messages, the stories may also contain bot actions that carry out a service provided by a bot. The stories may also be annotated with examples of the information that a bot should be extracting from user messages, thereby teaching the bots what to learn and how. A bot may be configured from annotated example conversations between a hypothetical user and the messaging bot that illustrate how an interaction could proceed. A developer may write a plurality of example conversations, where each conversation represents a scenario for the messaging bot. A developer submits an example-interaction repository to a natural-language machine learning component and receives a sequence model from the natural-language machine learning component in response. A bot server may then perform a user-to-bot conversation based on the sequence model. In an embodiment, the NLP component 450 may include other bot NLP models. For example, third party network accessible services associated with the entity represented by a web page may provide an NLP model to allow access to their services. For example, when the entity is a retail business, the entity may have an association with a third-party online storefront service to enable online ordering of products. The NLP model for the online storefront service may enable the page bot of the web page to communicate with the online storefront service so that the user may, for example, browse products, request or search for product information, or place orders. In some embodiments, a plurality of NLP components may be available, each with a different bot NLP model.

The instantiated page bot 490 may engage in a bot information exchange 490 with the web page 180 via a bot application interface component 480. The bot application interface component 480 may act as a front-end to the bot server 300 and/or messaging system for bot applications. The bot information exchange 490 may comprise accessing the contents of the web page 180 and retrieval of data from the web page 180. The interaction processing component 460 may use the meaning 410 to determine which page field to access. The bot application interface component 480 may use the web page authorization 404 to access the contents in the identified page field of the web page 180. The web page authorization 404 may include, for example, an access token, a password, or any other authorization mechanism that allows the page bot 490 to access and retrieve data from the web page 180.

The interaction processing component 460 may compose a message response including some or all of the data retrieved from the identified field. The message response may be transmitted to the user client 420 as a part of the user message exchange 430.

In an embodiment, after an initial message from a user client, the interaction processing component 460 may generate a menu from a set of fields on the web page and may present the menu to the user client. The menu may, for example, list what kinds of information may be requested. The interaction processing component may receive a selection of a menu item from the user client, which may be instead of receiving a natural language user message. The interaction processing component 460 may then proceed as discussed, retrieving data from a field associated with the selection; composing a message response including the retrieved data; and sending the message response to the client device.

In some embodiments, the instantiated page bot 490 may have an associated persona. In some cases the persona may be associated directly with the page bot, and may be selected by the web page administrator. In other cases, the persona may be selected by the NLP component and conveyed to the instantiated page bot 490, for example, to mirror a tone detected from prior communications from the administrator, e.g. from comments, posts, messages. For example, the prior communications of the administrator may be collected into a corpus that can be used to learn and characterize the tone of a particular administrator. In cases where a page has more than one administrator, each administrator may have their own tone. The persona may cause a selection of different analogous words to convey tone or emotion. Personas may convey, for example, formal or informal speech, slang, or friendly tones.

Figure 5:
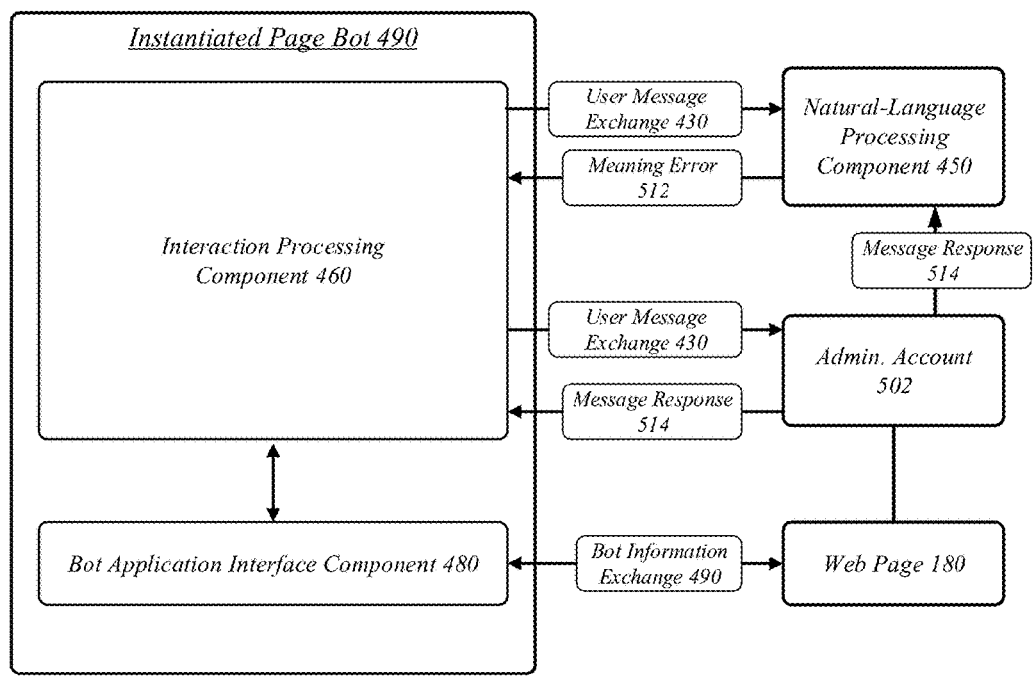
FIG. 5 illustrates an embodiment of a user-to-bot conversation being performed by a user request communication system.

FIG. 5 illustrates an embodiment of a user-to-bot conversation being performed by a user request communication system 100. In particular, the user-to-bot conversation depicted in FIG. 5 may take place when the system shown in FIG. 4 receives a user message for which a meaning cannot be determined.

As shown in FIG. 5, the interaction component 460 may have forwarded or otherwise made the received message from the user message exchange 430 accessible to the NLP component 450 with a request for a meaning. The NLP component 450 may not be able to determine a meaning for the message. The basic page bot NLP model may not have any rules or logic to understand the words in the message. This may occur, for example, if the message includes a request for information that is not available on the web page, e.g. "who works there?" or "are you wheelchair accessible?". In some cases, a meaning may be determined but with a confidence rating that is below some threshold. When a meaning cannot be determined at all or with sufficient confidence, the NLP component 450 may return a meaning error 512. The meaning error 512 may comprise a code, a keyword, a null value, or any other means of indicating that no meaning was determined.

When the interaction processing component 460 receives the meaning error 512, the message from the user message exchange 430 may be escalated to the administrator of the web page 180. For example, the message may be sent to an administrator account 502. The administrator account 502 may be an account in a messaging system used by the user request communication system 100. The administrator account 502 may be a messaging account associated with a host server of the web page 180, or an email account. The embodiments are not limited to these examples.

The administrator may be able to read the message that caused the meaning error and may compose a message response 514. The message response 514 may be returned to the page bot 490 for transmittal to the user client 420. The message response 514 may also be provided to the NLP component 450. The NLP component 450 may use the message and the message response 514 to update the model used to determine the meaning of a message. In an embodiment, the escalation of a message to an administrator may include "baton passing", where the transition from page bot to administrator appears seamless to the user. That is, the administrator message response appears in the same conversation as the earlier messages to and from the page bot, and, to the user, it appears as though they are still communicating with the same entity. Baton passing provides the ability to switch out the operator while maintaining the conversation with the same page bot. In an embodiment, the message history of a conversation is saved so that the new operator has access to the conversation context. Baton passing is described further in U.S. Provisional Patent Application No. 62/486,115, entitled "Bots for Groups, Music, and Message Threads" filed on Apr. 17, 2017, which is incorporated herein by reference in its entirety.

Figure 6:
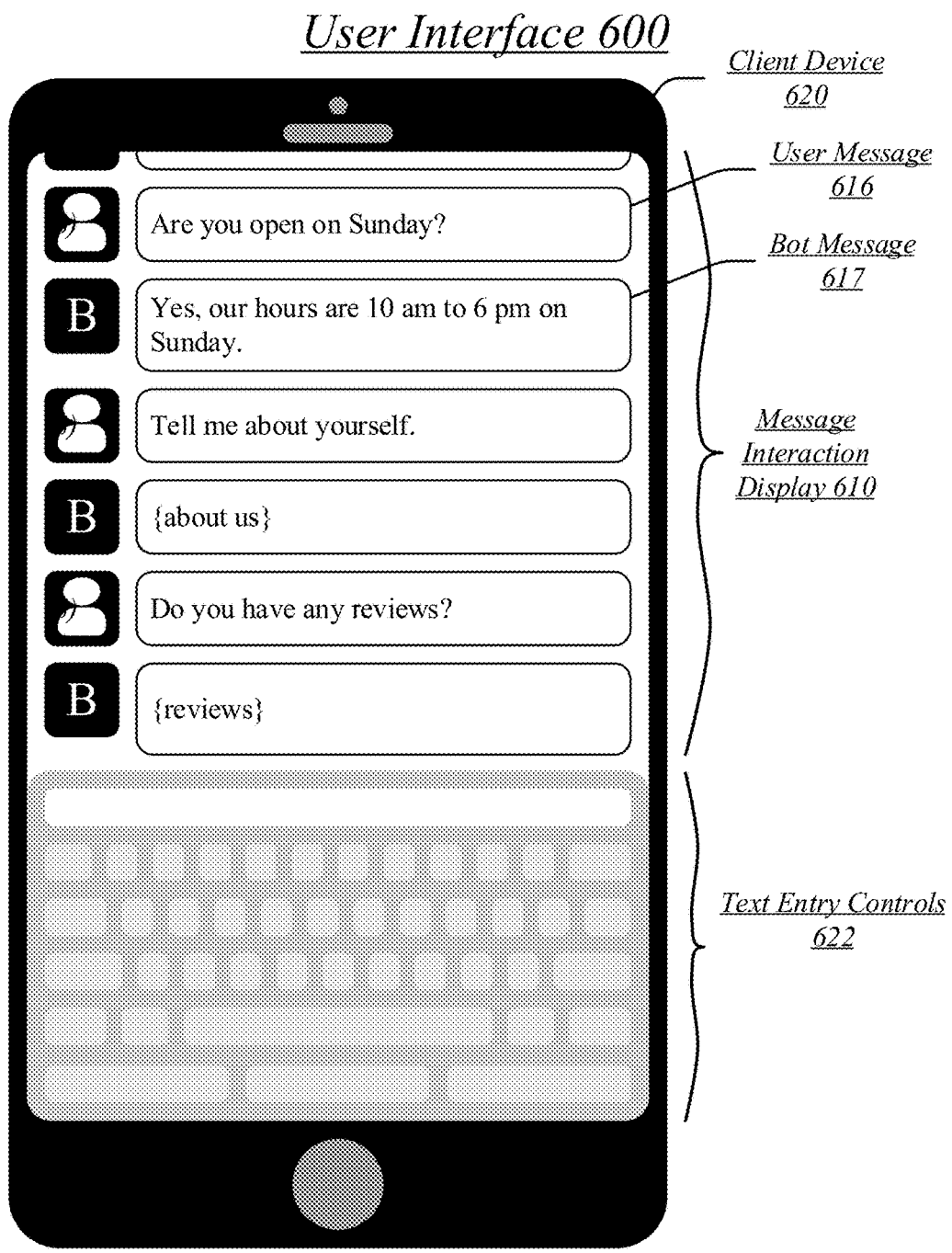
FIG. 6 illustrates a user interface for a user client.

FIG. 6 illustrates a user interface 600 for a user client. The user interface (UI) 200 may be presented on a client device 620. The client device 620 may correspond to, without limitation, a smartphone device 150, a personal computer device 180, a tablet device 160, a personal home assistant device, or any other form of client device. The UI 600 may be displayed via a web browser, such as may execute on a smartphone device 150, tablet device 160, personal computer device 180, or other device. The UI 600 may be displayed in a messaging application, such as may execute on a smartphone device 150, tablet device 160, personal computer device 180, or other device. The UI 600 may be displayed in an automated bot service application, such as may execute on a smartphone device 150, tablet device 160, personal computer device 180, or other device. When used with a personal home assistant device, the UI 600 may not be visually presented, but may instead be represented by audio data, e.g. spoken messages from the user, and text-to-speech audio data from the page bot. The UI 600 may be presented using a variety of techniques, without limitation to the examples listed here.

A user interface 600 may include a message interaction display 610. A message interaction display 610 may comprise a series of messages exchanged between a user of the client device 620 and a page bot 190. A message interaction display 610 may include a user message 616 of a plurality of user messages. User messages may be displayed in association with an avatar for the user. A message interaction display 610 may include a bot message 617 of a plurality of bot messages. Bot messages may be displayed in association with an avatar for the web page as corresponds to the page bot 190. The message interaction display 610 may, in some cases, only visibly include a portion of the user messages and bot messages, such as due to limited screen space of the client device 620.

A client device 620 may include controls for operating the user interface 600. The controls may include text entry controls 622 empowering the entering of text for the composition of text-based messages. The controls may include hardware controls. In some embodiments, controls may be touchscreen-based controls.

As illustrated, the user messages, e.g. user message 616, may include questions or requests for information that can be answered with information available on the web page 180 associated with the page bot 190 that is participating in the message interaction. The bot messages, e.g. bot message 617, may include information retrieved from the web page 180. For example, in the user message 616, the user desires to know if the entity associated with the web page and the page bot is open on Sunday. In response to that message, the page bot may have used the NLP component to determine that the message meaning is related to hours of operation on Sunday, and may have retrieved data from an hours of operation field 218. The page bot then composes a message response using the retrieved data and sends the message response as bot message 617.

Other user messages may include a request to "Tell me about yourself", which may cause the page bot to retrieve information from an about field 202. A user message requesting reviews may cause the page bot to retrieve information from a reviews field 206. In some embodiments, the page bot may retrieve the data and compose the message without any changes to the data. For example, if the hours of operation data lists business hours for each day of the week as "Sunday: 10 am-6 pm", the bot message 617 might say instead "Sunday: 10 am-6 pm". In other embodiments, a more conversational message response may be composed, e.g. adding "Yes, our hours are" to the data in the hours of operation field 218.

In addition to presenting text, the page bot may generate a message response that comprises, for example a mini-web browser view, a carousel view including plurality of images, embedded video, or a map view within the messaging interface.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
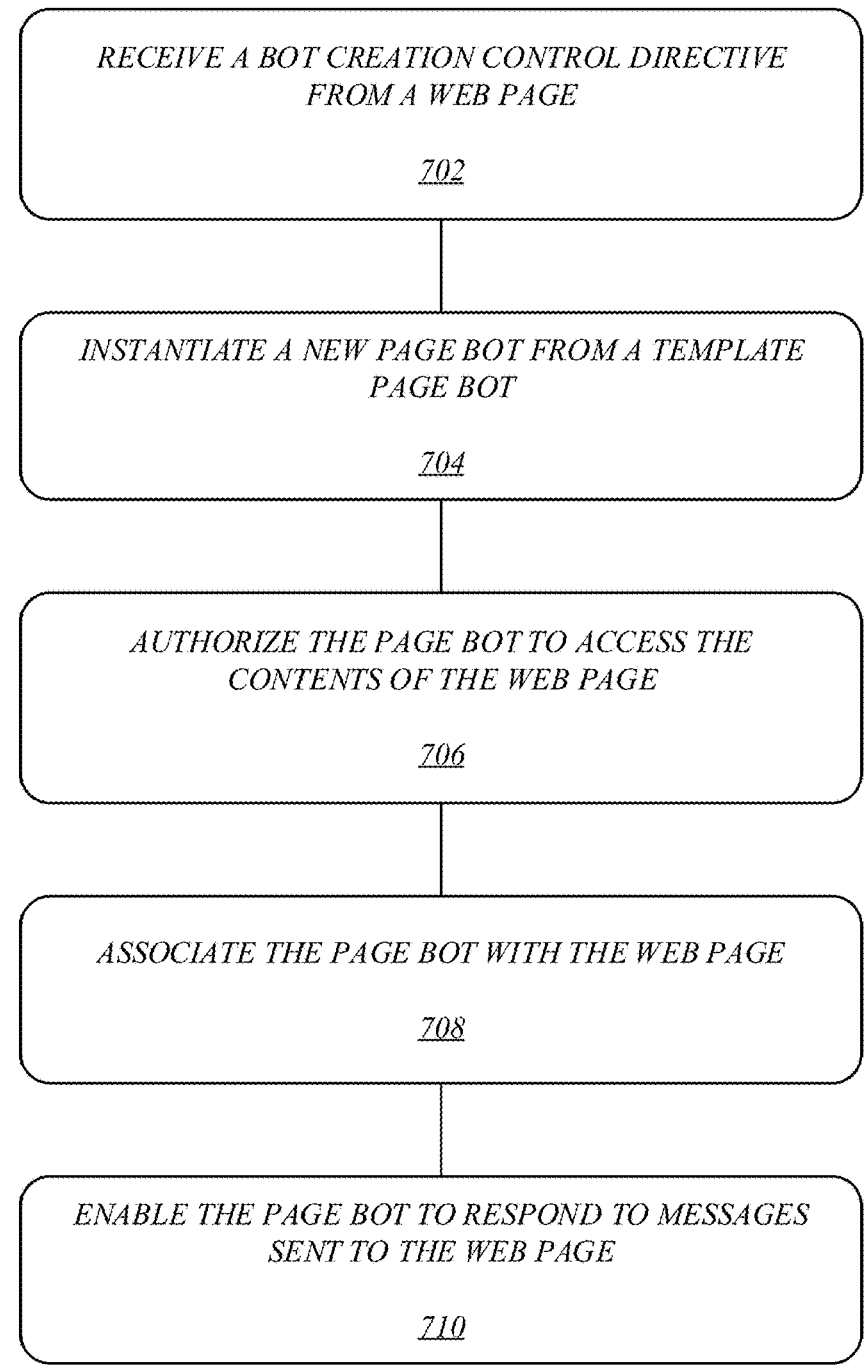
FIG. 7 illustrates an embodiment of a logic flow for the system of FIG. 1.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may receive a bot creation control directive from a web page at block 702. For example, a web page administrator may select a create bot control element on the web page, which may cause a bot creation control directive to be sent to a bot server 300.

The logic flow 700 may instantiate a new page bot from a template page bot at block 704. For example, a bot creation component 310 may create an instance of a page bot from a page bot template 312.

The logic flow 700 may authorize the page bot to access the contents of the web page at block 706. For example, the bot creation component 310 may request and obtain authorization from the web page, e.g. in the form of a permission, an authorization token, cookie, and so forth. The authorization may permit the instance of the page bot to access information on the page and to respond to messages sent to the web page on behalf of the web page.

The logic flow 700 may associate the page bot with the web page at block 708. The association 402 may be stored with the instance of the page bot. The association 402 may be used, for example, when communicating with the NLP component 450 to identify the web page that the instance of the page bot is associated with.

The logic flow 700 may enable the page bot to respond to messages sent to the web page at block 710. For example, the bot creation component 310 may register, associate, inform or otherwise connect the messaging system to the instance of the page bot and to the associated web page. In particular, messages sent to the web page may be accessed or received by the instance of the page bot.

The embodiments are not limited to this example.

Figure 8:
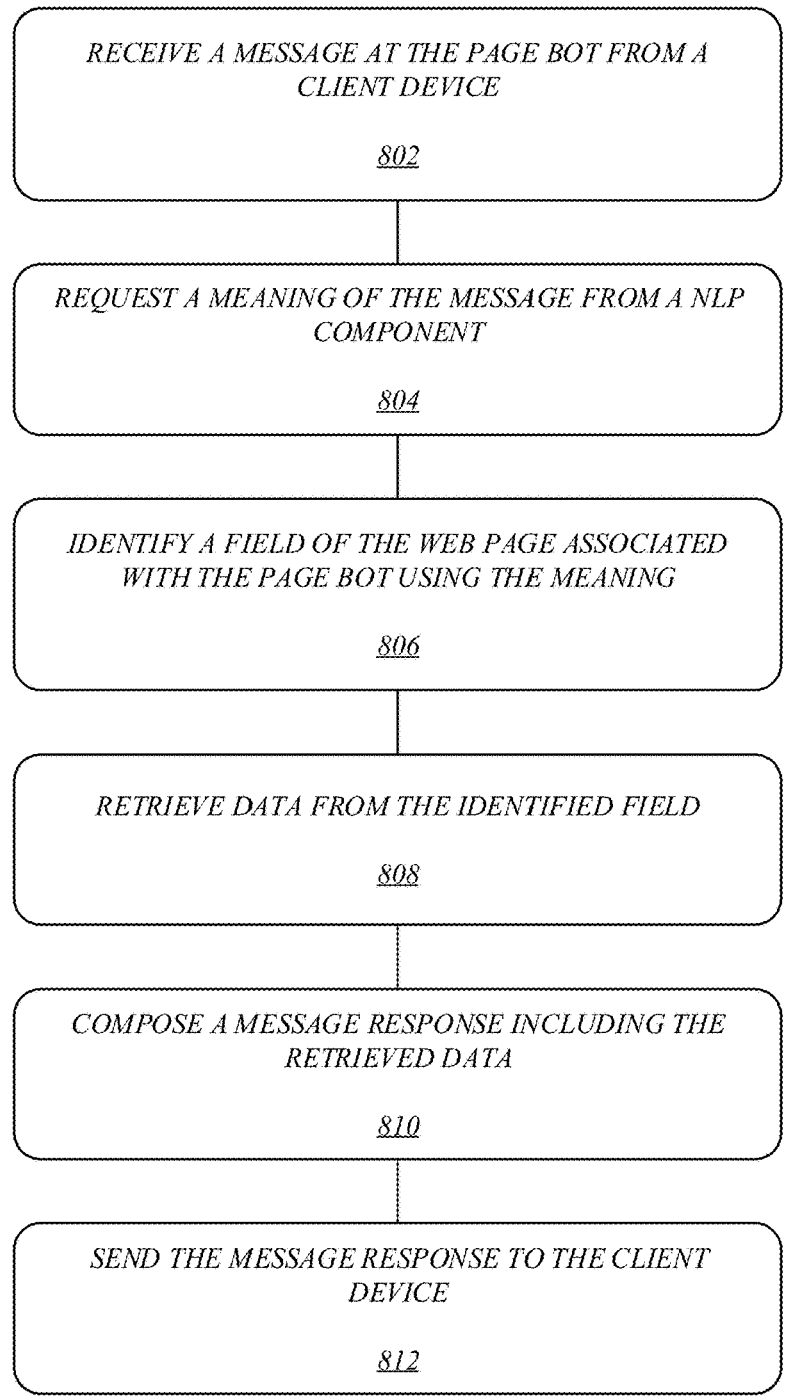
FIG. 8 illustrates an embodiment of a second logic flow for the system of FIG. 1.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 may receive a message at the page bot from a client device at block 802. For example, an instantiated page bot 490 may receive a message as part of a user message exchange 430 from a user client 420.

The logic flow 800 may request a meaning of the message from a natural language processing component at block 804. For example, the interaction processing component 460 of the instantiated page bot 490 may forward or otherwise make the received message accessible to the NLP component 450 with a request for a meaning. The NLP component 450 may then return a meaning 410 to the interaction processing component 460.

The logic flow 800 may identify a field of the web page associated with the page bot using the meaning at block 806.

The logic flow 800 may retrieve data from the identified field at block 808.

The logic flow 800 may compose a message response including the retrieved data at block 810. For example, the interaction processing component 460 may retrieve text from a page field and may generate a message response comprising the text. The interaction processing component 460 may retrieve images from a page field and may generate a message response comprising a carousel that presents the images in way that allows the user to scroll through a plurality of images in a direction perpendicular to the directionality of the message display. The interaction processing component 460 may retrieve a link to a web page or to data provided from another web site or application, and may generate a message response comprising the retrieved information as a mini-web view within the messaging application interface.

The logic flow 800 may send the message response to the client device at block 812.

Figure 9:
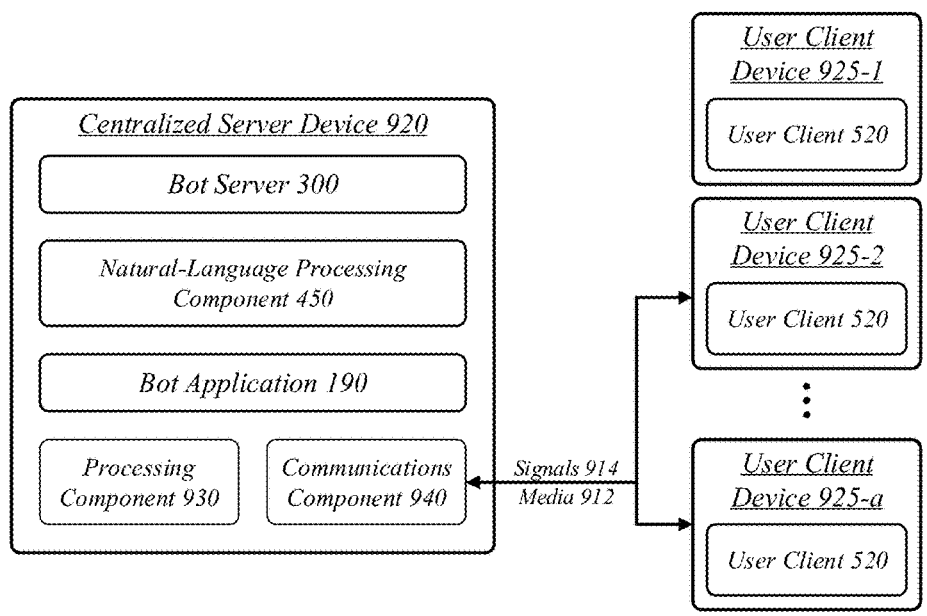
FIG. 9 illustrates an embodiment of a centralized system for the system of FIG. 1.

FIG. 9 illustrates a block diagram of a centralized system 900. The centralized system 900 may implement some or all of the structure and/or operations for the user request communication system 100 in a single computing entity, such as entirely within a single centralized server device 920.

The centralized server device 920 may comprise any electronic device capable of receiving, processing, and sending information for the user request communication system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 920 may execute processing operations or logic for the user request communication system 100 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 920 may execute communications operations or logic for the user request communication system 100 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 920 may communicate with other devices over a communications media 912 using communications signals 914 via the communications component 940. The devices may be internal or external to the centralized server device 920 as desired for a given implementation. The centralized server device 920 may implement the bot server 300, natural-language processing component 440, and page bot 190. This may comprise an embodiment in which the page bot 190 is executed by a messaging system. In some embodiments, a centralized server device 920 may be used with a page bot 190 executed by the bot provider. The centralized server device 920 may communicate with a plurality of user client devices 925, each executing a user client 520.

Figure 10:
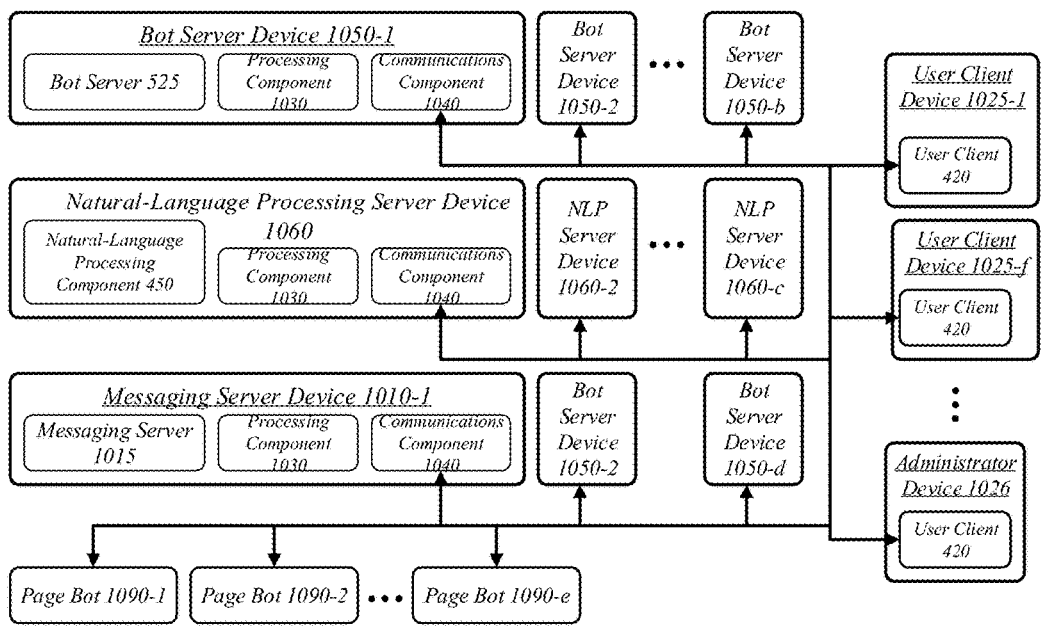
FIG. 10 illustrates an embodiment of a distributed system for the system of FIG. 1.

FIG. 10 illustrates a block diagram of a distributed system 1000. The distributed system 1000 may distribute portions of the structure and/or operations for the user request communication system 100 across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a plurality of messaging server devices 1010, bot server devices 1050, and natural-language processing server devices 1060. In general, the server devices 1010, 1050, and 1060 may be the same or similar to the centralized server device 920 as described with reference to FIG. 9. For instance, the server devices 1010, 1050, and 1060 may each comprise a processing component 1030 and a communications component 1040 which are the same or similar to the processing component 930 and the communications component 940, respectively, as described with reference to FIG. 9. In another example, the server devices 1010, 1050, and 1060 may communicate over a communications media 1012 using communications signals 1014 via the communications components 1040.

The messaging server devices 1010 may comprise or employ one or more programs that operate to perform various methodologies in accordance with the described embodiments. In one embodiment, for example, the messaging server devices 1010 may implement a plurality of messaging servers 1015.

The bot server devices 1050 may comprise or employ one or more programs that operate to perform various methodologies in accordance with the described embodiments. In one embodiment, for example, the bot server devices 1050 may implement a plurality of bot servers 300.

The natural-language processing (NLP) server devices 1060 may comprise or employ one or more programs that operate to perform various methodologies in accordance with the described embodiments. In one embodiment, for example, the NLP server devices 1060 may implement a plurality of NLP components 450.

The server devices 1010, 1050, and 1060 may communicate with a plurality of page bots 1090. Each of the plurality of page bots 1090 may provide different automated services, though there may also be duplication of automated services such as may provide for competition. The server devices 1010, 1050, and 1060 may communicate with a plurality of user client devices 1025, each executing a user client 420. The server devices 1010, 1050, and 1060 may communicate with a plurality of administrator devices 1026 operated by the administrators of the web pages 180.

Figure 11:
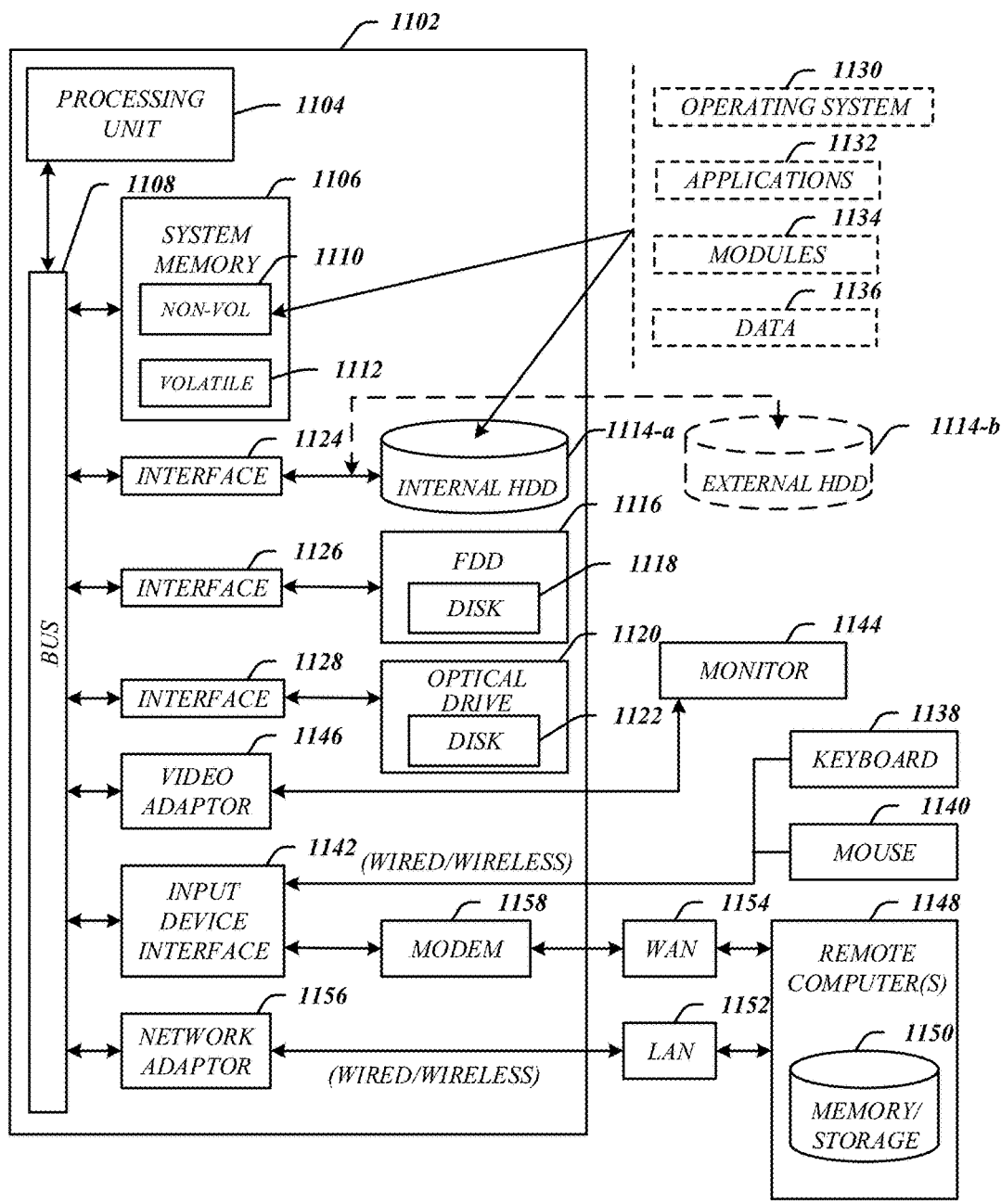
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 11, 10, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114-*a* (114-*b*), a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the user request communication system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
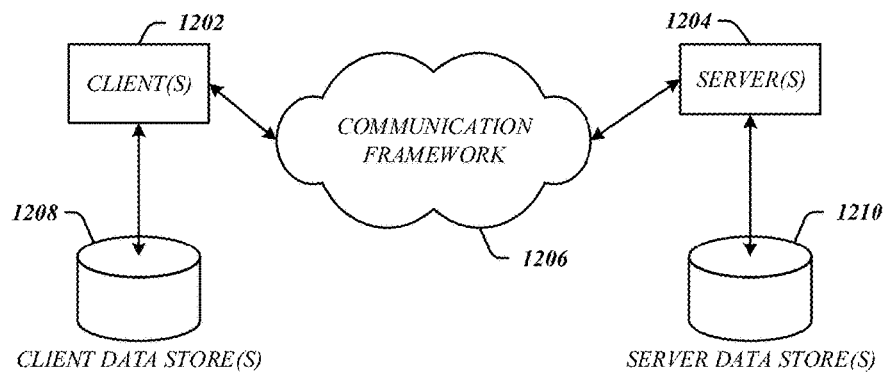
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement one or more user client 320, 420. The servers 1204 may implement one or more bot server 300, one or more natural-language machine learning component 450, and/or one or more messaging server 110. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 12/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 13:
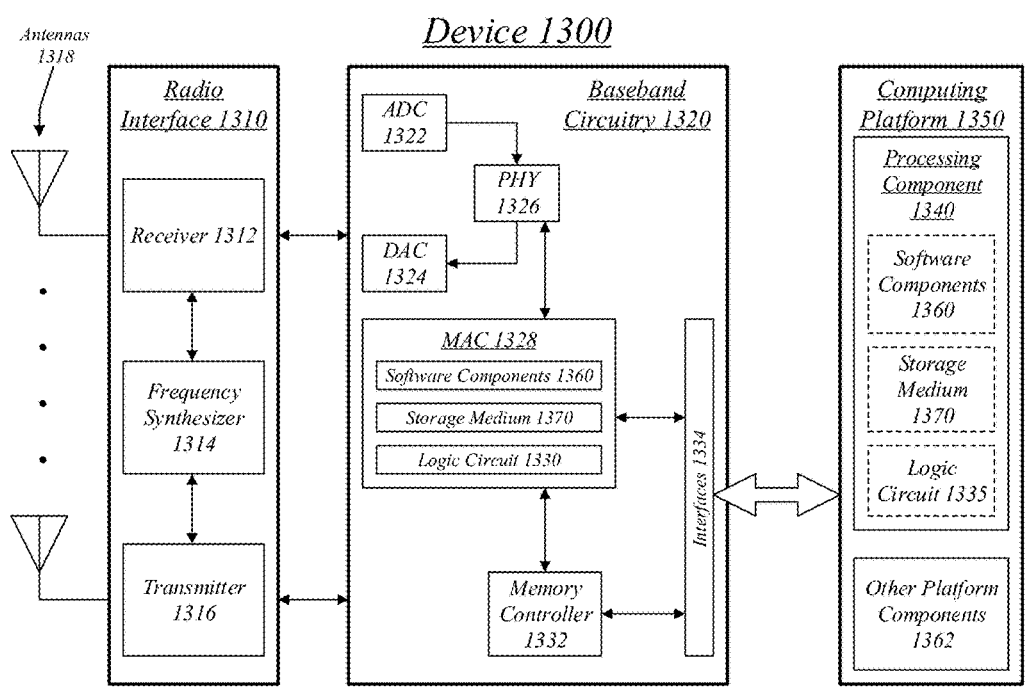
FIG. 13 illustrates an embodiment of a radio device architecture.

FIG. 13 illustrates an embodiment of a device 1300 for use in a multicarrier OFDM system, such as the user request communication system 100. Device 1300 may implement, for example, software components 1360 as described with reference to user request communication system 100 and/or a logic circuit 1335. The logic circuit 1335 may include physical circuits to perform operations described for the user request communication system 100. As shown in FIG. 13, device 1300 may include a radio interface 1310, baseband circuitry 1320, and computing platform 1350, although embodiments are not limited to this configuration.

The device 1300 may implement some or all of the structure and/or operations for the user request communication system 100 and/or logic circuit 1335 in a single computing entity, such as entirely within a single device. Alternatively, the device 1300 may distribute portions of the structure and/or operations for the user request communication system 100 and/or logic circuit 1335 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1310 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1310 may include, for example, a receiver 1312, a transmitter 1316 and/or a frequency synthesizer 1314. Radio interface 1310 may include bias controls, a crystal oscillator and/or one or more antennas 1318. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, an analog-to-digital converter 1322 for down converting received signals, a digital-to-analog converter 1324 for up converting signals for transmission. Further, baseband circuitry 1320 may include a baseband or physical layer (PHY) processing circuit 1356 for PHY link layer processing of respective receive/transmit signals. Baseband circuitry 1320 may include, for example, a processing circuit 1328 for medium access control (MAC)/data link layer processing. Baseband circuitry 1320 may include a memory controller 1332 for communicating with processing circuit 1328 and/or a computing platform 1350, for example, via one or more interfaces 1334.

In some embodiments, PHY processing circuit 1326 may include a frame construction and/or detection module, in combination with additional circuitry such as a buffer memory, to construct and/or deconstruct communication frames, such as radio frames. Alternatively or in addition, MAC processing circuit 1328 may share processing for certain of these functions or perform these processes independent of PHY processing circuit 1326. In some embodiments, MAC and PHY processing may be integrated into a single circuit.

The computing platform 1350 may provide computing functionality for the device 1300. As shown, the computing platform 1350 may include a processing component 1340. In addition to, or alternatively of, the baseband circuitry 1320, the device 1300 may execute processing operations or logic for the user request communication system 100 and logic circuit 1335 using the processing component 1340. The processing component 1340 (and/or PHY 1326 and/or MAC 1328) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1350 may further include other platform components 1362. Other platform components 1362 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1300 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1300 described herein, may be included or omitted in various embodiments of device 1300, as suitably desired. In some embodiments, device 1300 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Embodiments of device 1300 may be implemented using single input single output (SISO) architectures. However, certain implementations may include multiple antennas (e.g., antennas 1318) for transmission and/or reception using adaptive antenna techniques for beamforming or spatial division multiple access (SDMA) and/or using MIMO communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a bot creation control directive from a web page; instantiating a page bot from a template; authorizing the page bot to access the contents of the web page; associating the page bot with the web page; and enabling the page bot to respond to messages sent to the web page.

The method may further comprise receiving a message at the page bot from a client device; requesting a meaning of the message from a natural language processing (NLP) component; identifying a field in the web page associated with the page bot according to the meaning of the message; retrieving data from the identified field; composing a message response including the retrieved data; and sending the message response to the client device.

The method may further comprise receiving the message and sending the message response via a messaging system.

The method may further comprise receiving, from the NLP component, an indication a meaning was not determined; and escalating the message to an administrator account of the web page. The method may further comprise receiving a message response from the administrator account of the web page; and sending the message response to the user. The method may further comprise updating the NLP component according to the message response from the administrator account.

The method may further comprise receiving an action from the NLP component according to the meaning of the user message; and composing the message response by performing the action.

The method may further comprise generating a message response comprising text, a mini-web browser view, a carousel view including plurality of images, or a map view.

The method may further comprise generating a menu from a set of fields on the web page; presenting the menu to the client device; receiving a selection from the client device of a menu item; retrieving data from a field associated with the selection; composing a message response including the retrieved data; and sending the message response to the client device.

The method may further comprise associating the page bot with a NLP component for a network accessible service.

The method may further comprise associating the page bot with a persona; and composing the message response according to the persona.

An apparatus may comprise a processor circuit; and a bot creation component operative on the processor circuit to receive a bot creation control directive from a web page, instantiate a page bot from a page bot template, authorize the page bot to access the contents of the web page, associate the page bot with the web page, enable the page bot to respond to messages sent to the web page, and store the instantiated page bot.

The page bot may comprise a client communication component operative to receive a message at the page bot from a client device and send a message response to the client device; an interaction processing component operative to request a meaning of the message from a natural language processing (NLP) component, identify a field in the web page associated with the page bot according to the meaning of the message, and compose the message response including data retrieved from the identified field; and a bot application interface component operative to retrieve the data from the identified field.

The client communication component may be operative to receive the message and send the message response via a messaging system.

The interaction processing component may be operative to receive, from the NLP component, an indication that a meaning was not determined, and to escalate the message to an administrator account of the web page.

The interaction processing component may be operative to receive a message response from the administrator account of the web page; and the client communication component may be operative to send the message response to the client device.

The interaction processing component may be operative to receive an action from the NLP component according to the meaning of the user message; and to compose the message response by performing the action.

The interaction processing component may be operative to generate a message response comprising text, a mini-web browser view, a carousel view including plurality of images, or a map view.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a bot creation control directive from a web page;
instantiating a page bot from a template;
authorizing the page bot to access the contents of the web page;
associating the page bot with the web page thereby enabling the page bot to respond to messages sent to the webpage by retrieving the required information to respond to the message from the webpage:
receiving a message at the page bot from a client device;
requesting a meaning of the message from a natural language processing (NLP) component;
identifying a field in the web page associated with the page bot according to the meaning of the message;
retrieving data from the identified field; and
composing a message response including the retrieved data; and sending the message response to the client device.

2. The method of claim 1, comprising: receiving the message and sending the message response via a messaging system.

3. The method of claim 1, comprising:
receiving, from the NLP component, a meaning error; and
escalating the message to an administrator account of the web page.

4. The method of claim 3, comprising:
receiving a message response from the administrator account of the web page; and
sending the message response to the user.

5. The method of claim 4, comprising updating the NLP component according to the message response from the administrator account.

6. The method of claim 1, comprising:
receiving an action from the NLP component according to the meaning of the user message; and
composing the message response by performing the action.

7. An apparatus, comprising:
a processor circuit; and a bot creation component operative on the processor circuit to:
  receive a bot creation control directive from a web page;
  instantiate a page bot from a page bot template;
  authorize the page bot to access the contents of the web page;
  associate the page bot with the web page thereby enabling the page bot to respond to messages sent to the web page by retrieving the required information to respond to the message from the webpage;
  store the instantiated page bot;
a client communication component operative to:
  receive a message at the page bot from a client device and send a message response to the client device;
an interaction processing component operative to:
  request a meaning of the message from a natural language processing (NLP) component, identify a field in the web page associated with the page bot according to the meaning of the message, and compose the message response including data retrieved from the identified field; and
a bot application interface component operative to:
  retrieve the data from the identified field.

8. The apparatus of claim 7, the client communication component operative to receive the message and send the message response via a messaging system.

9. The apparatus of claim 7, the interaction processing component operative to receive, from the NLP component, a meaning error, and to escalate the message to an administrator account of the web page.

10. The apparatus of claim 7, the interaction processing component operative to receive a message response from the administrator account of the web page; and
  the client communication component operative to send the message response to the client device.

11. The apparatus of claim 7, the interaction processing component operative to receive an action from the NLP component according to the meaning of the user message; and to compose the message response by performing the action.

12. The apparatus of claim 7, the interaction processing component operative to generate a message response comprising text, a mini-web browser view, a carousel view including plurality of images, or a map view.

13. A non-transitory computer-readable storage medium comprising instructions that, when executed, cause a system to:
  receive a bot creation control directive from a web page;
  instantiate a page bot from a template;
  authorize the page bot to access the contents of the web page;
  associate the page bot with the web page, thereby enabling the page bot to respond to messages sent to the webpage by retrieving the required information to respond to the message from the webpage;
  receive a message at a page bot from a client device, the page bot associated with a web page;
  request, by the page bot, a meaning of the message from a natural language processing (NLP) component;
  identify, by the page bot, a field in the web page associated with the page bot according to the meaning of the message;
  retrieve, by the page bot, data from the identified field;
  compose, by the page bot, a message response including the retrieved data; and
  send, from the page bot, the message response to the client device.

14. The computer-readable storage medium of claim 13, comprising further instructions that, when executed, cause the system to:
  receive the message and send the message response via a messaging system.

15. The computer-readable storage medium of claim 13, wherein the page bot is instantiated from a template, authorized to access the contents of the web page and enabled to respond to messages sent to the web page.

16. The computer-readable storage medium of claim 13, comprising further instructions that, when executed, cause the system to:
  receive, from the NLP component, a meaning error; and
  escalate the message to an administrator account of the web page.

17. The computer-readable storage medium of claim 16, comprising further instructions that, when executed, cause the system to:
  receive a message response from the administrator account of the web page; and
  send the message response to the client device.

18. The computer-readable storage medium of claim 17, comprising further instructions that, when executed, cause the system to:
  receive an action from the NLP component according to the meaning of the user message; and
  compose the message response by performing the action.

* * * * *